(12) United States Patent
Wang

(10) Patent No.: US 10,119,800 B2
(45) Date of Patent: Nov. 6, 2018

(54) DISTANCE MEASURING WHEEL DEVICE

(71) Applicant: Hung-Hui Wang, Taichung (TW)

(72) Inventor: Hung-Hui Wang, Taichung (TW)

(73) Assignee: Hung-Hui Wang, Taichung (TW)

( * ) Notice: Subject to any disclaimer, the term of this patent is extended or adjusted under 35 U.S.C. 154(b) by 112 days.

(21) Appl. No.: 15/260,342

(22) Filed: Sep. 9, 2016

(65) Prior Publication Data

US 2018/0073848 A1   Mar. 15, 2018

(51) Int. Cl.
 *G01B 3/12*   (2006.01)

(52) U.S. Cl.
 CPC ..................... *G01B 3/12* (2013.01)

(58) Field of Classification Search
 CPC ............................... F16C 11/10; G01B 3/12
 USPC .................................................... 33/772, 779
 See application file for complete search history.

(56) References Cited

U.S. PATENT DOCUMENTS

| | | | | |
|---|---|---|---|---|
| 3,577,918 A * | 5/1971 | Wayfield | ................ | B41K 1/22 33/782 |
| 4,176,458 A * | 12/1979 | Dunn | .................... | G01B 3/12 33/781 |
| 4,403,419 A * | 9/1983 | Graves | ................... | G01D 9/38 33/523 |
| 6,782,631 B1 * | 8/2004 | Face, III | ................. | G01C 7/04 33/533 |
| 7,040,036 B1 * | 5/2006 | Wang | ..................... | G01B 3/12 33/772 |
| 7,536,805 B1 * | 5/2009 | Tang | ........................ | G01B 3/12 33/772 |
| 7,555,846 B1 * | 7/2009 | Wang | ..................... | G01B 3/12 33/772 |
| 7,694,431 B2 * | 4/2010 | Tang | ........................ | G01B 3/12 33/772 |
| 8,082,676 B2 * | 12/2011 | Tang | ........................ | G01B 3/12 33/772 |
| 8,572,861 B2 * | 11/2013 | Lai | .......................... | G01B 3/12 33/779 |
| 9,797,438 B1 * | 10/2017 | Wang | ..................... | F16C 11/10 |
| 2010/0024235 A1 * | 2/2010 | Tang | ........................ | G01B 3/12 33/782 |
| 2010/0024236 A1 * | 2/2010 | Tang | ........................ | G01B 3/12 33/782 |

\* cited by examiner

*Primary Examiner* — Yaritza Guadalupe-McCall

(57) ABSTRACT

A distance measuring wheel device includes a base and a counter is arranged inside the base and laterally connected to the axle of a first gear. Two connection arms respectively extend from the base. The wheel is rotatably between the two connection arms. Each end of the axle of the wheel is rotatably connected with one end of each connection arm opposite to the base. A first chain gear is connected to the axle of the wheel corresponding to the first gear. A second gear is rotatably arranged at one side of the base and engaged with the first gear. A third gear is coaxially linked to the second gear. A fourth gear is engaged with the third gear. The second chain gear is coaxially linked to the fourth gear. The chain is surrounded and engaged with the first chain gear and the second chain gear.

7 Claims, 5 Drawing Sheets

DISTANCE MEASURING WHEEL DEVICE

BACKGROUND OF THE INVENTION

1. Fields of the Invention

The present invention relates to a distance measuring wheel device.

2. Descriptions of Related Art

The conventional distance measuring wheel device known to the applicant discloses a tubular portion with a handle and a wheel on two ends thereof, the wheel is pivotably connected between two connection arms. A counter is connected to the distance measuring wheel device and cooperated with a transmission unit. One of the connection arms has two connection holes which represent two different measuring systems. The transmission unit includes a top transmission member and a bottom transmission member. The bottom transmission member is engaged with the inclined gear on the axle of the wheel. The top transmission member has an inclined gear. An adjustment base includes a stepped surface, the top portion of the stepped portion is cooperated with an inclined gear which has an annular toothed portion, so as to be respectively engaged with the inclined gear of the top transmission member and the gear of the axle of the counter. The stepped surface of the adjustment base has two connection holes for different measuring systems. When moving the adjustment base between the two connection holes, different counter with different gears can be used to the distance measuring wheel device.

However, the conventional distance measuring wheel device involves too many parts which cause high manufacturing cost and longer assembling time required. The belt has to be replaced after a certain period of time of use.

The present invention intends to provide a distance measuring wheel device which improves the shortcomings mentioned above.

SUMMARY OF THE INVENTION

The present invention relates to a distance measuring wheel device and comprises a base having a counter connected thereto, and two connection arms respectively extend downward from two sides of the base. A wheel is rotatably connected between the two connection arms. The axle of the wheel is pivotably connected to two respective distal ends of the two connection arms. A transmission unit is connected to the counter and one of the two connection arms, and located away from the counter. The transmission unit is further connected to the axle of the wheel. The counter is activated by a chain.

Preferably, the transmission device includes a first gear, a second gear, a third gear, a fourth gear, a first chain gear, a second chain gear and the chain. The counter is radially connected to the axle of the first gear. The first chain gear is connected to the axle of the wheel. The second gear is located on one side of the base and engaged with the first gear. The third gear is co-axially connected to the second gear. The fourth gear is engaged with the third gear. The second chain gear is co-axially connected to the fourth gear. The chain is engaged between the first and second chain gears.

Preferably, an inner housing covers the first, second, third and fourth gears, the second chain gear and a portion of the chain that is engaged with the first chain gear.

Preferably, an outer housing is cooperated with the connection arm that is connected to the second chain gear to cover the first, second, third and fourth gears, the first chain gear, the second chain gear and the chain.

Preferably, an outer housing is cooperated with the connection arm that is connected to the second chain gear to cover the inner housing, the first gear and the a portion of the chain that is exposed beyond the inner housing.

Preferably, a stand is pivotably connected to one of the connection arms.

Preferably, an extension tube extends from the base and a handle is connected to the top of the extension tube.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
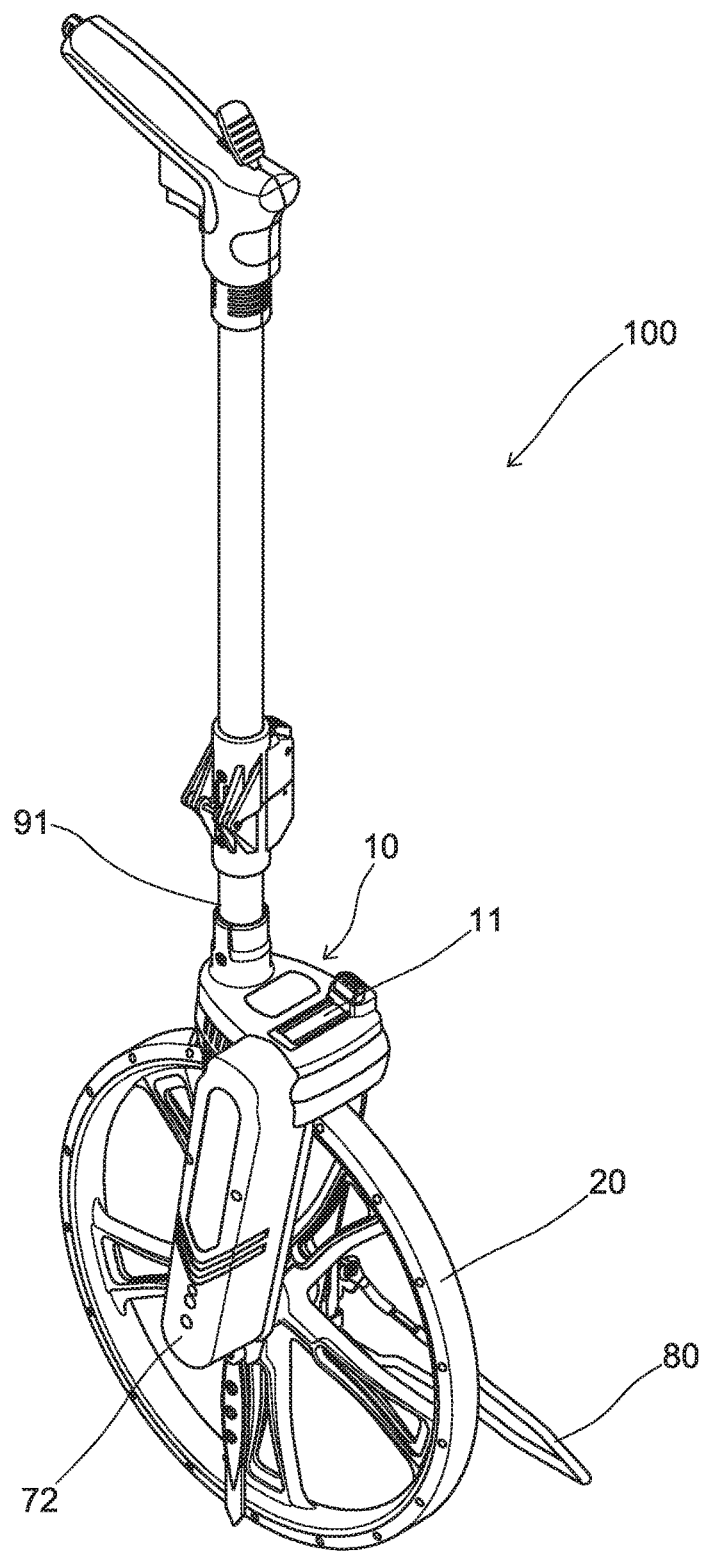
FIG. 1 is a perspective view to show the distance measuring wheel device of the present invention.
Figure 2:
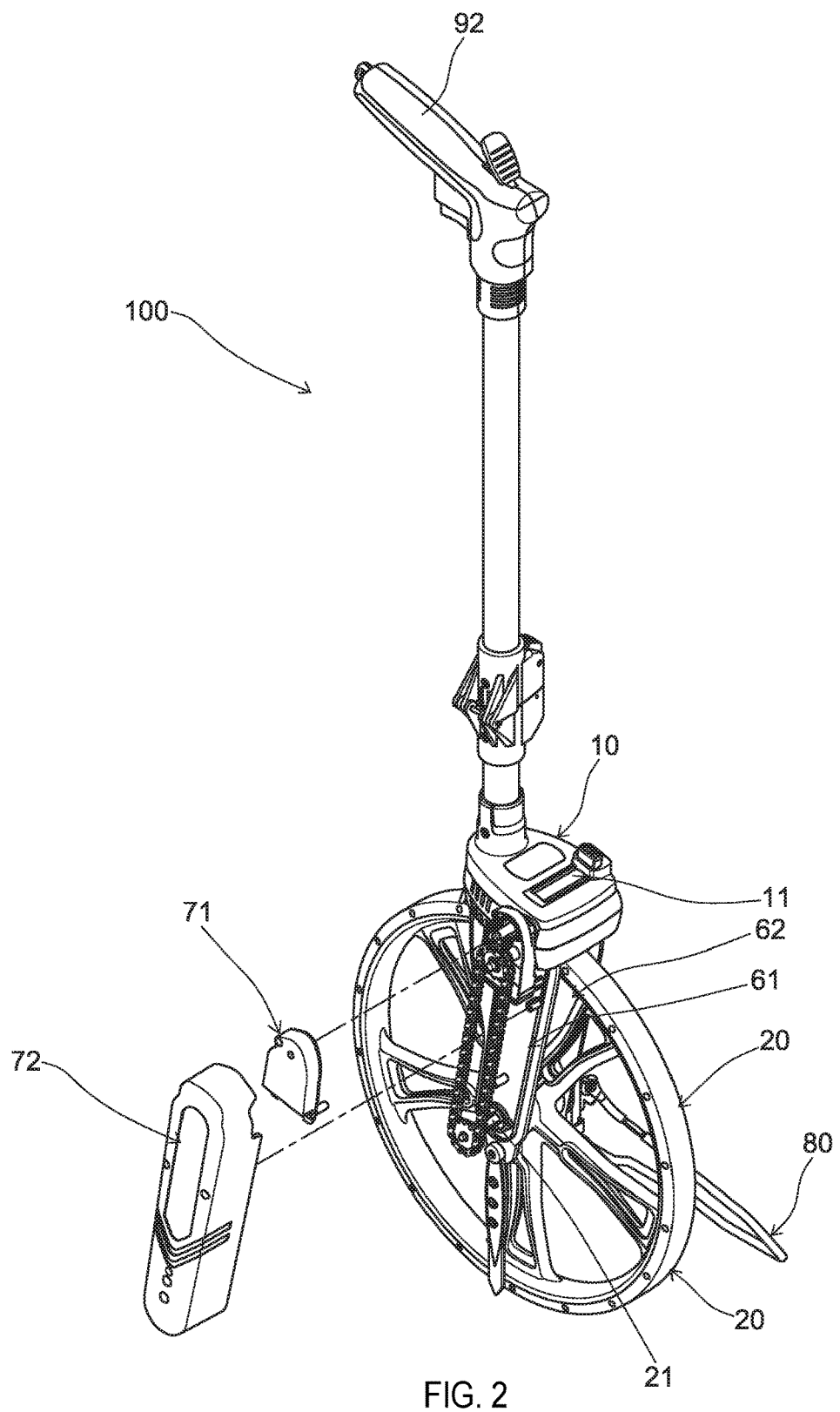
FIG. 2 is an exploded view to show the inner and outer housing and the distance measuring wheel device of the present invention.
Figure 3:
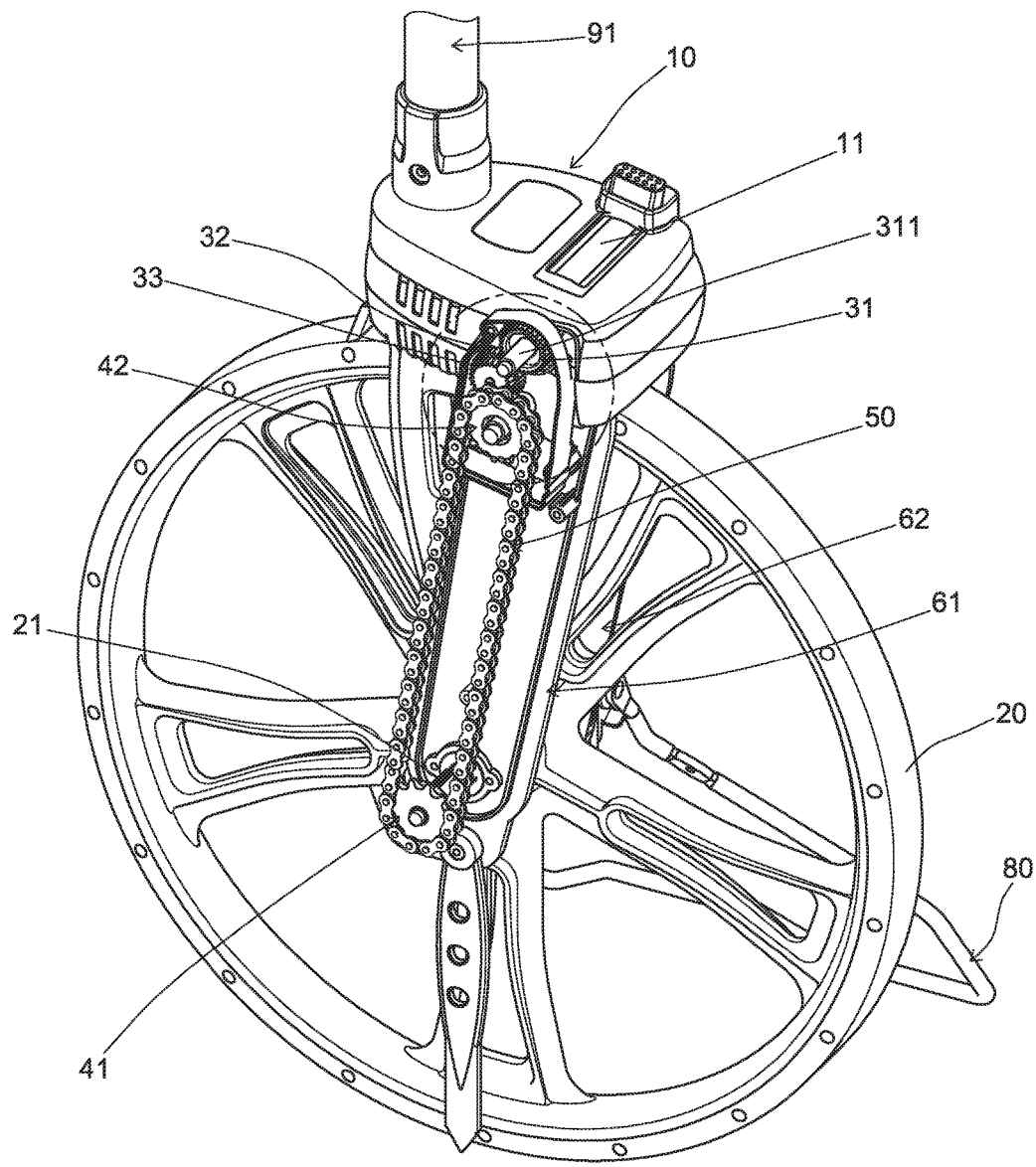
FIG. 3 is an enlarged view of a portion of the distance measuring wheel device of the present invention.
Figure 4:
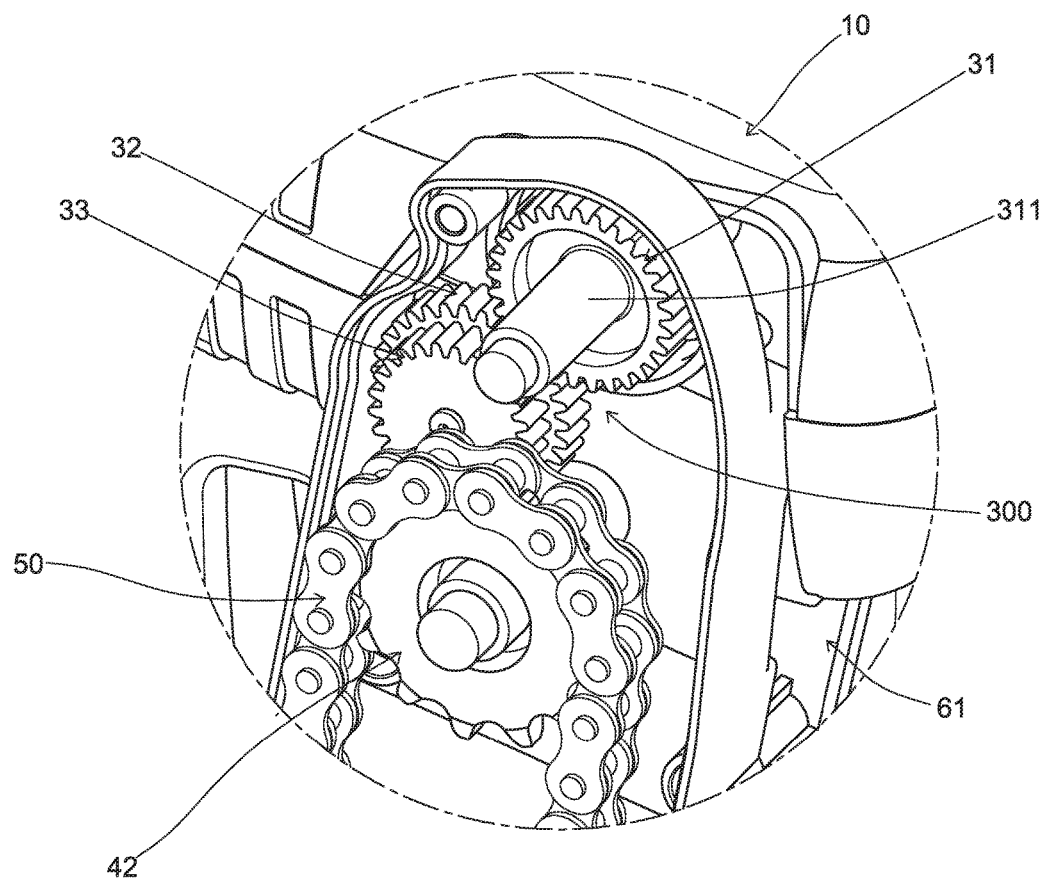
FIG. 4 is another enlarged view of a portion of the distance measuring wheel device of the present invention.
Figure 5:
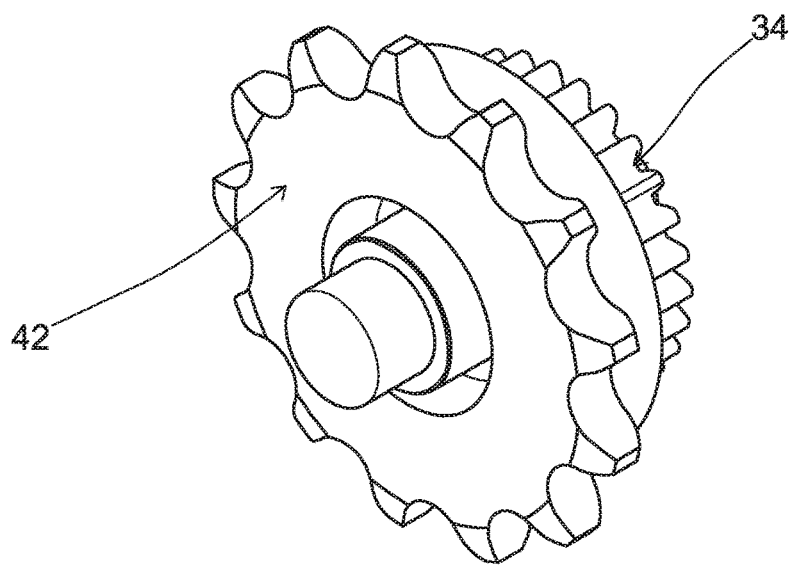
FIG. 5 shows that the fourth gear connected to the second chain gear of the distance measuring wheel device of the present invention.
Figure 6:
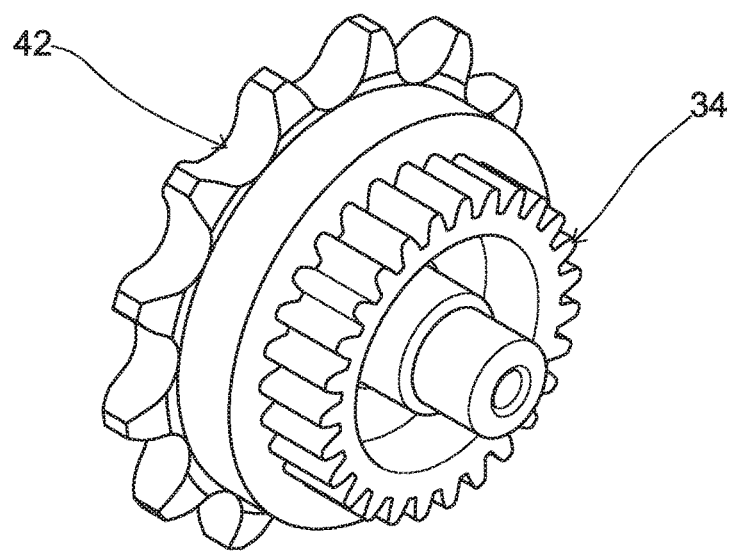
FIG. 6 is another view to show that the fourth gear connected to the second chain gear of the distance measuring wheel device of the present invention.

Referring to FIGS. 1 to 6, the distance measuring wheel device 100 of the present invention comprises a base 10 having a counter 11 connected thereto and two connection arms 61, 62 respectively extend downward from two sides of the base 10. A wheel 20 is rotatably connected between the two connection arms 61, 62. Specifically, the axle 21 of the wheel 20 pivotably is connected to two respective distal ends of the two connection arms 61, 62. The first chain gear 41 is connected to the axle 21 of the wheel 20 and located on the same side as the first gear 31.

A transmission unit 300 is connected to the counter 11 and connection arm 61, and located away from the counter 11. One end of the connection arm 61 that is located away from the counter 11 is connected to the axle 21 of the wheel 20. The counter 11 is activated by a chain 50.

The second gear 32 is located on one side of the base 10 and engaged with the first gear 31. The third gear 33 is co-axially connected to the second gear 32. The fourth gear 34 is engaged with the third gear 33. The second chain gear 42 is co-axially connected to the fourth gear 34. The chain 50 is engaged between the first and second chain gears 41, 42.

The distance measuring wheel device 100 includes an inner housing 71 which covers the first, second, third and fourth gears 31, 32, 33, 34, the second chain gear 42 and a portion of the chain 50 that is engaged with the first chain gear 41.

The distance measuring wheel device 100 further includes an outer housing 72 which is cooperated with the connection arm 61 that is connected to the second chain gear 42 to cover the first, second, third and fourth gears 31, 32, 33, 34, the first chain gear 41, the second chain gear 42 and the chain 50. That is to say, the outer housing 72 covers the inner housing 71, and the first chain gear 41, a portion of the chain 50 that is exposed beyond the inner housing 71 and the first chain gear 41 that are not covered by the inner housing 71.

In order to support the distance measuring wheel device 100, a stand 80 is pivotably connected to one of the connection arms 62. The stand 80 is pivotably connected to the connection arm 62, so that when the distance measuring wheel device 100 is not in use, the stand 80 together with the wheel 20 supports the distance measuring wheel device 100 to be upright.

The distance measuring wheel device 100 further has an extension tube 91 extending from the top of the base 10, and a handle 92 is connected to the top of the extension tube 91. The user holds the handle 92 to move the distance measuring wheel device 100.

When in use, the stand 80 is pivoted away from the wheel 20, and the user holds the handle 92 to move the base 10 such that the wheel 20 rolls forward. The rotation of the wheel 20 drives the first chain gear 41 to drive the chain 50, the chain 50 further drives the second chain gear 42, the fourth gear 34, the third gear 33, the second gear 32, the first gear 31. The rotation of the first gear 31 drives the axle 311 so as to activate the counter 11 to count the distance that the wheel 20 travels.

By using the chain 50 instead of the use of inclined gears, the number parts required is reduced and the assembling time required is reduced. The chain 50 is durable compared with the belt as used in the conventional distance measuring wheel devices so that the maintenance cost is reduced as well.

While we have shown and described the embodiment in accordance with the present invention, it should be clear to those skilled in the art that further embodiments may be made without departing from the scope of the present invention.

What is claimed is:

1. A distance measuring wheel device comprising:
    a base having a counter connected thereto and two connection arms respectively extending downward from two sides of the base;
    a wheel rotatably connected between the two connection arms, an axle of the wheel pivotably connected to two respective distal ends of the two connection arms, and
    a transmission unit connected to the counter and one of the two connection arms, and located away from the counter, the transmission unit further connected to the axle of the wheel, the counter being activated by a chain.

2. The distance measuring wheel device as claimed in claim 1, wherein the transmission device includes a first gear, a second gear, a third gear, a fourth gear, a first chain gear, a second chain gear and the chain, the counter is radially connected to an axle of the first gear, the first chain gear is connected to the axle of the wheel, the second gear is located on one side of the base and engaged with the first gear, the third gear is co-axially connected to the second gear, the fourth gear is engaged with the third gear, the second chain gear is co-axially connected to the fourth gear, the chain is engaged between the first and second chain gears.

3. The distance measuring wheel device as claimed in claim 2, wherein an inner housing covers the first, second, third and fourth gears, the second chain gear and a portion of the chain that is engaged with the first chain gear.

4. The distance measuring wheel device as claimed in claim 3, wherein an outer housing is cooperated with the connection arm that is connected to the second chain gear to cover the inner housing, the first gear and the a portion of the chain that is exposed beyond the inner housing.

5. The distance measuring wheel device as claimed in claim 2, wherein an outer housing is cooperated with the connection arm that is connected to the second chain gear to cover the first, second, third and fourth gears, the first chain gear, the second chain gear and the chain.

6. The distance measuring wheel device as claimed in claim 1, wherein a stand is pivotably connected to one of the connection arms.

7. The distance measuring wheel device as claimed in claim 1, wherein an extension tube extends from the base and a handle is connected to a top of the extension tube.

* * * * *